United States Patent
Gao et al.

(10) Patent No.: US 11,683,272 B2
(45) Date of Patent: Jun. 20, 2023

(54) PACKET PROCESSING METHOD, PACKET FORWARDING APPARATUS, AND PACKET PROCESSING APPARATUS

(71) Applicant: HUAWEI TECHNOLOGIES CO., LTD., Shenzhen (CN)

(72) Inventors: Yuan Gao, Nanjing (CN); Tiyu Huang, Nanjing (CN); Wanmei Zeng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 115 days.

(21) Appl. No.: 17/411,505

(22) Filed: Aug. 25, 2021

(65) Prior Publication Data
US 2021/0385163 A1  Dec. 9, 2021

Related U.S. Application Data

(63) Continuation of application No. PCT/CN2019/127868, filed on Dec. 24, 2019.

(30) Foreign Application Priority Data

Feb. 27, 2019 (CN) .......................... 201910146394.4

(51) Int. Cl.
*H04L 45/586* (2022.01)
*H04L 45/745* (2022.01)
(Continued)

(52) U.S. Cl.
CPC .......... *H04L 45/745* (2013.01); *H04L 45/24* (2013.01); *H04L 45/42* (2013.01); *H04L 45/566* (2013.01); *H04L 45/586* (2013.01)

(58) Field of Classification Search
CPC ....... H04L 45/745; H04L 45/24; H04L 45/42; H04L 45/566; H04L 45/586; H04L 45/74
See application file for complete search history.

(56) References Cited

U.S. PATENT DOCUMENTS

2014/0146817 A1\* 5/2014 Zhang .................. H04L 45/74
370/392
2016/0301579 A1\* 10/2016 Djukic ................ H04L 41/5058
(Continued)

FOREIGN PATENT DOCUMENTS

CN  104518935 A  4/2015
CN  105141434 A  12/2015
(Continued)

OTHER PUBLICATIONS

CloudEngine 12800 Series Switches, Configuration Guide—VXLAN 5 Enhanced VXLAN Functions,Huawei Technologies Co, Issue 02 (Apr. 20, 2021) (Year: 2021).*
(Continued)

*Primary Examiner* — Alina A Boutah
(74) *Attorney, Agent, or Firm* — Hauptman Ham, LLP

(57) ABSTRACT

This application discloses a packet processing method that is applied to an EVPN, where the EVPN includes a first network device and a second network device. The method includes: receiving, by the first network device, a VXLAN packet sent by the second network device, where the VXLAN packet includes a path identifier and a service packet, the path identifier indicates a path from the first network device to a VNF device through an IPU, and the service packet includes a destination IP address; determining, by the first network device based on the path identifier, first routing information; and forwarding, by the first network device, the service packet to the VNF device via the IPU based on the first routing information and the destination IP address.

12 Claims, 8 Drawing Sheets

(51) Int. Cl.
  *H04L 45/24* (2022.01)
  *H04L 45/42* (2022.01)
  *H04L 45/00* (2022.01)

(56) References Cited

U.S. PATENT DOCUMENTS

| | | | |
|---|---|---|---|
| 2016/0344622 A1 | 11/2016 | Liu et al. | |
| 2017/0126815 A1 | 5/2017 | Kim et al. | |
| 2018/0070262 A1* | 3/2018 | Nakano | .................. H04L 45/64 |
| 2019/0229937 A1* | 7/2019 | Nagarajan | ............... H04L 12/18 |

FOREIGN PATENT DOCUMENTS

| | | | | |
|---|---|---|---|---|
| CN | 105634942 A | | 6/2016 | |
| CN | 106105116 A | | 11/2016 | |
| CN | 106559324 A | | 4/2017 | |
| CN | 107566265 A | * | 1/2018 | ............. H04L 12/46 |
| CN | 107786437 A | | 3/2018 | |
| CN | 107924226 A | * | 4/2018 | ........... H04L 45/586 |
| CN | 108259291 A | | 7/2018 | |
| CN | 109314649 A | | 2/2019 | |
| CN | 106209637 B | * | 7/2019 | ........... H04L 12/413 |
| CN | 107846342 B | * | 11/2020 | ......... H04L 12/4633 |
| EP | 3206349 A1 | | 8/2017 | |
| JP | 2018518925 A | * | 7/2018 | ........ H04L 12/4641 |
| WO | WO-2015077878 A1 | * | 6/2015 | ........... H04L 12/462 |
| WO | 2015165311 A1 | | 11/2015 | |
| WO | WO-2018120798 A1 | * | 7/2018 | ......... H04L 12/1877 |
| WO | WO-2019105462 A1 | * | 6/2019 | ............. H04L 12/46 |

OTHER PUBLICATIONS

Chen Ye et al, Implementation and research of EVPN based on BGP protocol, Thesis Submitted to Nanjing University of Posts and Telecommunications for the Degree of Master of Engineering, Apr. 2017, With an English Abstract, total 73 pages.
Talvinder Singh et al, VXLAN and EVPN for Data Center Network Transformation, 2017 8th International Conference on Computing, Communication and Networking Technologies (ICCCNT), Dec. 14, 2017, total 6 pages.
M. Mahalingam et al., "Virtual extensible Local Area Network (VXLAn): A Framework for Overlaying Virtualized Layer 2 Networks over Layer 3 Networks", Aug. 2014, total: 22 pages.
A. Sajassi, Ed et al., "A Network Virtualization Overlay Solution Using Ethernet VPN (EVPN)", Internet Engineering Task Force (IETF) Request for Comments: 8365 Category: Standards Track ISSN: 2070-1721, Mar. 2018, total: 33 pages.
F. Maino. Ed et al., "Generic Protocol Extension for VXLAN draft-ietf-nvo3-vxlan-gpe-06", Network Working Group Internet-Draft Intended status: Informational Expires: Nov. 1, 2018, total: 17pages.
European Search Report issued in corresponding European Application No. 19917508.4, dated Feb. 1, 2022, pp. 1-34, European Patent Office, Munich, Germany.

* cited by examiner

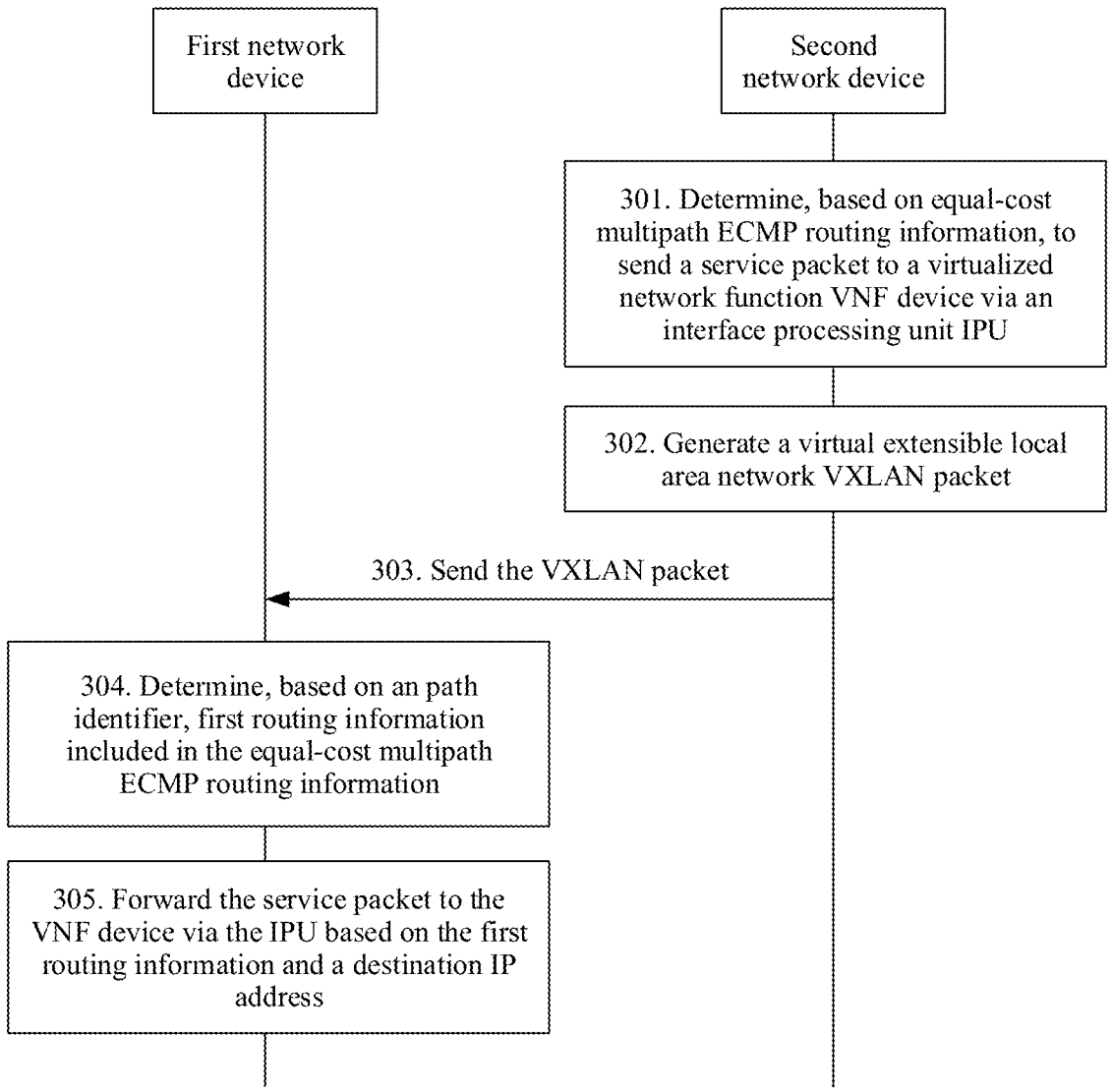

PACKET PROCESSING METHOD, PACKET FORWARDING APPARATUS, AND PACKET PROCESSING APPARATUS

CROSS-REFERENCE TO RELATED APPLICATIONS

This application is a continuation of International Application No. PCT/CN2019/127868, filed on Dec. 24, 2019, which claims priority to Chinese Patent Application No. 201910146394.4, filed on Feb. 27, 2019. The disclosures of the aforementioned applications are hereby incorporated by reference in their entireties.

TECHNICAL FIELD

The present application relates to the field of communications technologies, and in particular, to a packet processing method, a packet forwarding apparatus, and a packet processing apparatus.

BACKGROUND

A virtual extensible virtual local area network (VXLAN) is a layer 2 virtual private network (VPN) technology based on an Internet Protocol (IP) network and uses an encapsulation form of "media access control (MAC) in user datagram protocol (UDP)". An Ethernet virtual private network (EVPN) is a layer 2 VPN technology in which a control plane uses a multiprotocol border gateway protocol (MP-BGP) to notify EVPN routing information, and a forwarding plane forwards a packet through VXLAN encapsulation.

In an EVPN VXLAN telecom cloud scenario, after receiving traffic of user equipment (UE), an operator edge router (PE) usually sends the traffic to different switches via a data center gateway (DCGW) in load balancing mode. After receiving the traffic, the switch sends the traffic to a virtualized network function (VNF) device. Therefore, to send the traffic to different switches in a load balancing mode, the VNF device is deployed across switches (top of rack, TOR) in different network segments. In other words, there are a plurality of routes for sending the traffic to the VNF device via the switch. FIG. 1 is a schematic diagram of an architecture in the prior art. As shown in FIG. 1, a first network device may directly send traffic to a VNF device via directly connected next-hop interface processing units (IPU) IPU 1 and IPU 2, or may send the traffic to the VNF device via an indirectly connected IPU 3. The IPU 3 is directly connected to a second network device. Therefore, when using the route passing through the IPU 3, the first network device first forwards the traffic to the second network device, and the second network device forwards the traffic to the VNF device, so that the VNF device can provide a service externally. Reference may be made to FIG. 1 for understanding.

However, when the traffic reaches the second network device, the second network device may not know that the traffic is to be forwarded to the VNF device via the IPU 3. Therefore, the second network device recalculates a route and considers that the traffic can be forwarded to the VNF device via the IPU 2 or the IPU 1, and the traffic is forwarded to the first network device again in this case. The first network device then recalculates a route and considers that the traffic can be forwarded to the VNF device via the IPU 3, and the traffic is forwarded to the second network device again in this case. Consequently, a three-layer traffic loop is caused.

SUMMARY

Embodiments of the present application provide a packet processing method, a packet forwarding apparatus, and a packet processing apparatus, to precisely send a service packet to a VNF device corresponding to a destination IP address, thereby avoiding a three-layer traffic loop.

In view of this, the embodiments of this application provide the following solutions.

According to a first aspect, an embodiment of this application provides a packet processing method. The processing method may be applied to an Ethernet virtual private network EVPN, and the EVPN may include a first network device and a second network device. The processing method may include: receiving, by the first network device, a virtual extensible local area network VXLAN packet sent by the second network device, where the VXLAN packet may include a path identifier and a service packet, the path identifier indicates a path from the first network device to a virtualized network function VNF device through an interface processing unit IPU, the first network device is connected to the IPU, the service packet includes a destination Internet Protocol IP address, the destination IP address is an IP address of the VNF device, and the IPU is connected to the VNF device; determining, by the first network device based on the path identifier, first routing information included in equal-cost multipath ECMP routing information, where the first routing information indicates the path from the first network device to the VNF device through the IPU; and forwarding, by the first network device, the service packet to the VNF device via the IPU based on the first routing information and the destination IP address. Because the VXLAN packet carries the path identifier that may be used to indicate a forwarding path of the service packet, efficiency and precision of forwarding the service packet are effectively improved.

Optionally, with reference to the first aspect, in a first possible implementation, before the receiving, by the first network device, a virtual extensible local area network VXLAN packet sent by the second network device, the method may further include: obtaining, by the first network device, the first routing information; and storing, by the first network device, the first routing information in the ECMP routing information. Because the first routing information may be used to indicate the path from the first network device to the VNF device through the IPU, storing the first routing information in the ECMP routing information can provide a convenient path selection manner for subsequent forwarding of a packet such as a service packet.

Optionally, with reference to the first possible implementation of the first aspect, in a second possible implementation, after the obtaining, by the first network device, the first routing information, the method may further include: generating, by the first network device, EVPN routing information based on the first routing information, where the EVPN routing information may include the path identifier and the destination IP address; and sending, by the first network device, the EVPN routing information to the second network device.

Optionally, with reference to the first aspect and the first and the second possible implementations of the first aspect, in a third possible implementation, the VXLAN packet may further include a flag bit, and the flag bit indicates that the VXLAN packet includes the path identifier. If the flag bit is set to 1, a label field may be filled into the VXLAN packet to store the path identifier, so that the path identifier can be relatively easily obtained, and a forwarding path of the service packet can be learned.

According to a second aspect, an embodiment of this application provides a packet processing method. The processing method may be applied to an Ethernet virtual private network EVPN, and the EVPN may include a first network device and a second network device. The processing method may include: determining, by the second network device based on equal-cost multipath ECMP routing information, to send a service packet to a virtualized network function VNF device via an interface processing unit IPU, where the first network device is connected to the IPU, the IPU is connected to the VNF device, the service packet includes a destination Internet Protocol IP address, and the destination IP address is an IP address of the VNF device; generating, by the second network device, a virtual extensible local area network VXLAN packet, where the VXLAN packet includes a path identifier and the service packet, and the path identifier indicates a path from the first network device to the VNF device through the IPU; and sending, by the second network device, the VXLAN packet to the first network device, where the path identifier triggers the first network device to forward the service packet based on the path indicated by the path identifier. Because the VXLAN packet carries the path identifier that may be used to indicate a forwarding path of the service packet, efficiency and precision of forwarding the service packet are effectively improved.

Optionally, with reference to the second aspect, in a first possible implementation, before the generating, by the second network device, a virtual extensible local area network VXLAN packet, the method may further include: receiving, by the second network device, EVPN routing information sent by the first network device, where the EVPN routing information may include the path identifier and the destination IP address.

Optionally, with reference to the first possible implementation of the second aspect, in a second possible implementation, after the receiving, by the second network device, the EVPN routing information sent by the first network device, the method may further include: storing, by the second network device, the EVPN routing information in the ECMP routing information. Storing the EVPN routing information in the ECMP routing information can provide a convenient path selection manner for subsequent forwarding of a packet such as a service packet.

Optionally, with reference to the second aspect and the first and the second possible implementations of the second aspect, in a third possible implementation, the VXLAN packet may further include a flag bit, and the flag bit indicates that the VXLAN packet may include the path identifier. If the flag bit is set to 1, a label field may be filled into the VXLAN packet to store the path identifier, so that the path identifier can be relatively easily obtained, and a forwarding path of the service packet can be learned.

According to a third aspect, an embodiment of this application provides a packet forwarding apparatus. The packet forwarding apparatus is applied to an Ethernet virtual private network EVPN, and the EVPN further includes a packet processing apparatus. The packet forwarding apparatus may include: a receiving module, configured to receive a virtual extensible local area network VXLAN packet sent by a packet generation apparatus, where the VXLAN packet may include a path identifier and a service packet, the path identifier indicates a path from the packet forwarding apparatus to a virtualized network function VNF device through an interface processing unit IPU, the packet forwarding apparatus is connected to the IPU, the service packet includes a destination Internet Protocol IP address, the destination IP address is an IP address of the VNF device, and the IPU is connected to the VNF device; a determining module, configured to determine, based on the path identifier included in the VXLAN packet received by the receiving module, first routing information included in equal-cost multipath ECMP routing information, where the first routing information indicates the path from the packet forwarding apparatus to the VNF device through the IPU; and a forwarding module, configured to forward the service packet to the VNF device via the IPU based on the first routing information determined by the determining module and the destination IP address included in the VXLAN packet received by the receiving module.

Optionally, with reference to the third aspect, in a first possible implementation, the packet forwarding apparatus further includes: an obtaining module, configured to obtain the first routing information before the receiving module receives the virtual extensible local area network VXLAN packet sent by the packet processing apparatus; and a storage module, configured to store, in the ECMP routing information, the first routing information obtained by the obtaining module.

Optionally, with reference to the first possible implementation of the third aspect, in a second possible implementation, the packet forwarding apparatus further includes: a generation module, configured to generate EVPN routing information based on the first routing information after the obtaining module obtains the first routing information, where the EVPN routing information may include the path identifier and the destination IP address; and a sending module, configured to send, to the packet processing apparatus, the EVPN routing information generated by the generation module.

Optionally, with reference to the third aspect and the first and the second possible implementations, in a third possible implementation, the VXLAN packet may further include a flag bit, and the flag bit indicates that the VXLAN packet may include the path identifier.

According to a fourth aspect, an embodiment of this application provides a packet processing apparatus. The packet processing apparatus is applied to an Ethernet virtual private network EVPN, and the EVPN further includes a packet forwarding apparatus. The packet processing apparatus may include: a determining unit, configured to determine, based on equal-cost multipath ECMP routing information, to send a service packet to a virtualized network function VNF device via an interface processing unit IPU, where the packet forwarding apparatus is connected to the IPU, the IPU is connected to the VNF device, the service packet may include a destination Internet Protocol IP address, and the destination IP address is an IP address of the VNF device; a generation unit, configured to generate a virtual extensible local area network VXLAN packet, where the VXLAN packet may include a path identifier and the service packet determined by the determining unit, and the path identifier indicates a path from the packet forwarding apparatus to the VNF device through the IPU; and a sending unit, configured to send, to the packet forwarding apparatus, the VXLAN packet generated by the generation unit, where the path identifier triggers the packet forwarding apparatus to forward the service packet based on the path indicated by the path identifier.

Optionally, with reference to the fourth aspect, in a first possible implementation, the packet processing apparatus further includes: a receiving unit, configured to: before the generation unit generates the virtual extensible local area network VXLAN packet, receive EVPN routing information sent by the packet forwarding apparatus, where the EVPN routing information includes the path identifier and the destination IP address.

Optionally, with reference to the first possible implementation of the fourth aspect, in a second possible implementation, the packet processing apparatus further includes: a storage unit, configured to store the EVPN routing information in the ECMP routing information after the receiving unit receives the EVPN routing information sent by the packet forwarding apparatus.

Optionally, with reference to the fourth aspect and the first and the second possible implementations, in a third possible implementation, the VXLAN packet may further include a flag bit, and the flag bit indicates that the VXLAN packet may include the path identifier.

According to a fifth aspect, an embodiment of this application provides a computer device. The computer device may include a processor, a memory, and an input/output (I/O) interface. The memory stores program instructions, and the processor is configured to execute the program instructions stored in the memory, so that the computer device performs the packet processing method according to any one of the first aspect or the possible implementations of the first aspect.

According to a sixth aspect, an embodiment of this application provides a computer device. The computer device may include a processor, a memory, and an input/output (I/O) interface. The memory stores program instructions, and the processor is configured to execute the program instructions stored in the memory, so that the computer device performs the packet processing method according to any one of the second aspect or the possible implementations of the second aspect.

A seventh aspect of this application provides a computer-readable storage medium. The computer-readable storage medium stores instructions. When the instructions are run on a computer device, the computer device is enabled to perform the packet processing method according to any one of the first aspect or the possible implementations of the first aspect.

An eighth aspect of this application provides a computer-readable storage medium. The computer-readable storage medium stores instructions. When the instructions are run on a computer device, the computer device is enabled to perform the packet processing method according to any one of the second aspect or the possible implementations of the second aspect.

A ninth aspect of this application provides a computer program product including instructions. When the computer program product runs on a computer, the computer is enabled to perform the packet processing method according to any one of the first aspect or the possible implementations of the first aspect.

A tenth aspect of this application provides a computer program product including instructions. When the computer program product runs on a computer, the computer is enabled to perform the packet processing method according to any one of the second aspect or the possible implementations of the second aspect.

An eleventh aspect of this application provides a chip system. The chip system includes a processor, configured to support a packet forwarding apparatus in implementing the function according to any one of the first aspect or the possible implementations of the first aspect. In a possible design, the chip system further includes a memory, and the memory is configured to store a program instruction and data that are necessary for the packet forwarding apparatus. The chip system may include a chip, or may include a chip and another discrete device.

A twelfth aspect of this application provides a chip system. The chip system includes a processor, configured to support a packet processing apparatus in implementing the function according to any one of the second aspect or the possible implementations of the second aspect. In a possible design, the chip system further includes a memory, and the memory is configured to store a program instruction and data that are necessary for the packet processing apparatus. The chip system may include a chip, or may include a chip and another discrete device.

For technical effects brought by any implementation of the third aspect, the fifth aspect, the seventh aspect, the ninth aspect, or the eleventh aspect, refer to technical effects brought by different implementations of the first aspect. Details are not described herein again.

For technical effects brought by any implementation of the fourth aspect, the sixth aspect, the eighth aspect, the tenth aspect, or the twelfth aspect, refer to technical effects brought by different implementations of the second aspect. Details are not described herein again.

It can be learned from the foregoing technical solutions that the embodiments of this application have the following advantages:

By receiving the VXLAN packet that is sent by the second network device and that includes the path identifier and the service packet, the first network device can determine the first routing information based on the path identifier. In addition, the first routing information indicates the path from the first network device to the VNF device through the IPU, and therefore, the first network device may send the service packet to the VNF device via the IPU based on the first routing information and the destination IP address. In this way, the service packet is precisely sent to the VNF device corresponding to the destination IP address, thereby avoiding a three-layer traffic loop.

BRIEF DESCRIPTION OF DRAWINGS

FIG. 3 is a schematic diagram of an embodiment of a packet processing method according to an embodiment of this application;

FIG. 4 is a schematic diagram of a packet header (VXLAN header) of a VXLAN packet;

DESCRIPTION OF EMBODIMENTS

The embodiments of this application provide a packet processing method, a packet forwarding apparatus, and a packet processing apparatus, to precisely send a service packet to a VNF device corresponding to a destination IP address, thereby avoiding a three-layer traffic loop.

The following clearly describes the technical solutions in the embodiments of this application with reference to the accompanying drawings in the embodiments of this application. It is clearly that the described embodiments are some but not all of the embodiments of this application. All other embodiments obtained by a person of ordinary skill in the art based on the embodiments of this application without creative efforts shall fall within the protection scope of this application.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of this application described herein can be implemented in orders except the order illustrated or described herein. Moreover, the terms "include", "have", or any other variant thereof are intended to cover a non-exclusive inclusion.

Figure 1:
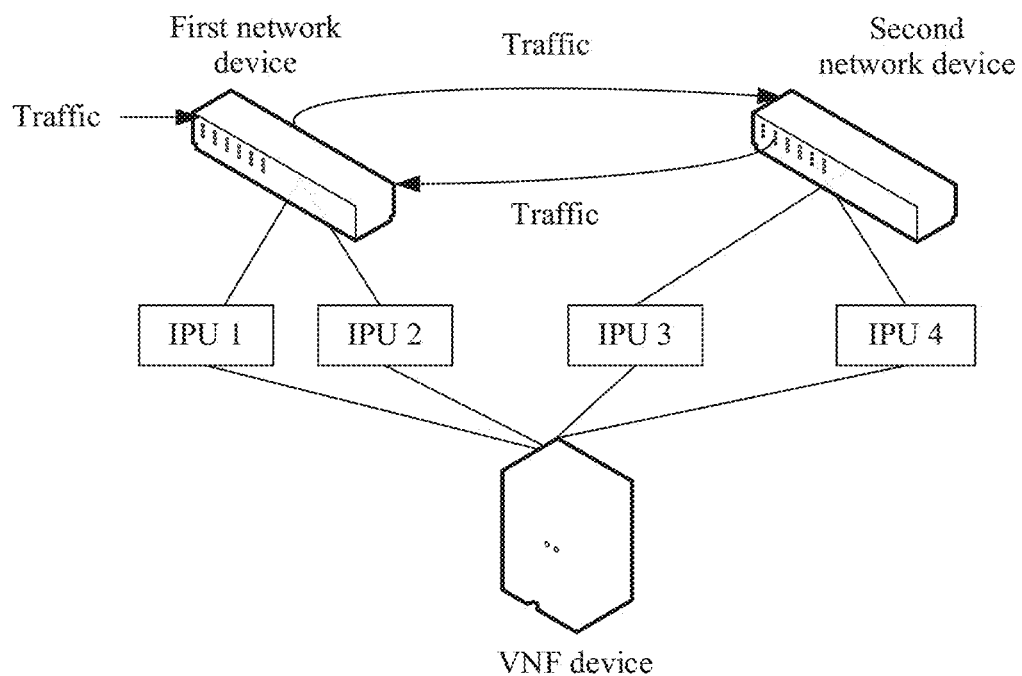
FIG. 1 is a schematic diagram of an architecture in the prior art.
Figure 2:
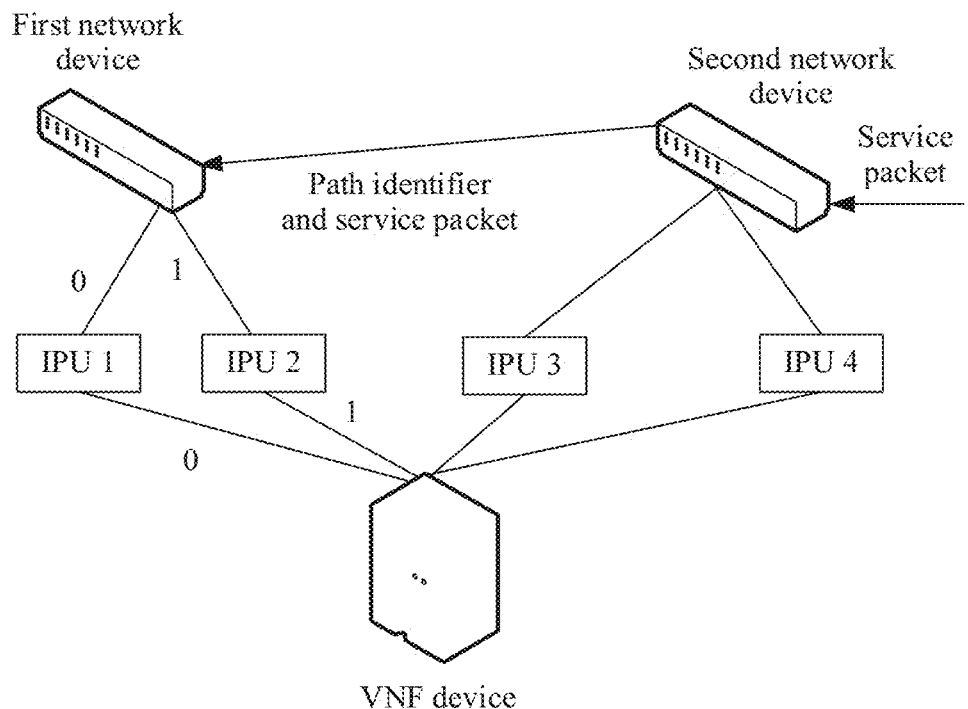
FIG. 2 is a schematic architectural diagram of a packet processing system according to an embodiment of this application.

For ease of understanding, this application proposes a packet processing method. The method is applied to a packet processing system shown in FIG. 2. FIG. 2 is a schematic architectural diagram of a packet processing system according to an embodiment of this application. As shown in the figure, FIG. 2 includes a first network device, a second network device, and a VNF device. In addition, it can be learned from FIG. 2 that a plurality of interface processing units IPUs are connected between the first network device and the VNF device. Some IPUs are directly connected to the first network device, such as an IPU 1 and an IPU 2. The remaining IPUs such as an IPU 3 and an IPU 4 may be connected to the first network device via another network device that has a neighbor relationship with the first network device, for example, the second network device.

In an EVPN VXLAN telecom cloud scenario, a service packet is sent to the VNF device by using different nodes in a load balancing mode, for example, by using a node such as an IPU. In this case, if inter-network segment deployment is adopted for the VNF device (the inter-network segment means that the first network device is located in a server in an area A, the second network device is located in a server in an area B, and the servers in the area A and the area B do not intersect each other), a path identifier is generated in advance on the first network device to prevent a three-layer loop from occurring. For example, an identifier of a path reaching the VNF device via the IPU 1 is marked as "0", and an identifier of a path reaching the VNF device via the IPU 2 is marked as "1". Therefore, when sending a service packet to the first network device, the second network device sends the service packet in a manner in which the service packet is encapsulated into a VXLAN packet together with the path identifier. The mentioned path identifier is used to identify a path direction of the service packet after the service packet is sent to the first network device: sequentially passing through the first network device, the IPU, and the VNF device.

It should be noted that the VNF device mentioned above is a virtualized network function device, and mainly provides an external service channel for a service packet. The VNF device usually includes an interface processing unit IPU and a service processing unit (data plane unit, DPU). The IPU mentioned above mainly has a function of providing network switching for the VNF device. The mentioned service packet may be specifically VXLAN traffic, an Ethernet frame, or the like. This is not specifically limited herein.

It should be noted that devices such as the first network device and the second network device in FIG. 2 may be specifically switches. Regardless of whether these devices are switches or entities, they are merely names. These names are not limited in this embodiment of this application.

With reference to the description of the schematic architectural diagram of this application in FIG. 2, a packet processing method provided in the embodiments of this application is described below. FIG. 3 is a schematic diagram of an embodiment of a packet processing method according to an embodiment of this application.

As shown in FIG. 3, the embodiment of the packet processing method provided in this embodiment of this application includes the following steps.

301. A second network device determines, based on equal-cost multipath ECMP routing information, to send a service packet to a virtualized network function VNF device via an interface processing unit IPU.

In this embodiment, equal-cost multipath (ECMP) routing is an initial routing policy that is for calculating a routing weight and that is generated when a plurality of optimal paths are in parallel when the VXLAN packet is transferred to a single destination, so that a plurality of equal-cost paths may be simultaneously used when the VXLAN packet reaches network environments of a same destination address. Therefore, bandwidth can be increased to a large extent when the plurality of paths have traffic with a balanced load. Therefore, the second network device may determine, based on the ECMP routing information, a path that forward the service packet to the VNF device via the IPU, that is, select and determine a forwarding path of the service packet from the plurality of equal-cost paths.

It should be noted that both the second network device and a first network device are deployed in an Ethernet virtual private network EVPN, the first network device is connected to the IPU, and the IPU is connected to the VNF device. The service packet includes a destination IP address, and the destination IP address is an IP address that may be used to identify the VNF device. It indicates that after determining the service packet, the second network device may clearly learn a destination to which the service packet is sent, because the service packet includes the destination IP address.

302. The second network device generates a virtual extensible local area network VXLAN packet.

In this embodiment, the VXLAN packet includes a path identifier and the service packet, and the path identifier may be used to indicate a path from the first network device to the VNF device through the IPU. FIG. 4 is a schematic diagram of a packet header (VALAN header) of a VXLAN packet. As shown in FIG. 4, a flag bit may be set in the packet header of the VXLAN packet to indicate that the VXLAN packet includes the path identifier. To be specific, the flag bit is first set in the packet header of the VXLAN packet, and is usually set at a location of a sixth bit of the packet header. If a value of the flag bit is 1, it indicates that the VXLAN packet carries the path identifier mentioned above. On the contrary, if the value is 0, it indicates that the VXLAN packet does not carry the path identifier. Therefore, after the flag bit is set to 1, that is, when the value is 1, a label field may be further filled into the packet header to store the path identifier. The label field is usually located in a multiprotocol label switching label (MPLS label) field in the packet header. For details, reference may be made to FIG. 4 for understanding.

303. The second network device sends the VXLAN packet to a first network device.

In this embodiment, after generating the corresponding VXLAN packet, the second network device may send the VXLAN packet to the first network device, so that the first network device may obtain the path identifier and the service packet that are included in the VXLAN packet.

It should be noted that because the service packet includes the destination IP address, after receiving the VXLAN packet, the first network device may learn, by querying a local routing table, a virtualized network function device corresponding to the destination IP address.

304. The first network device determines, based on a path identifier, first routing information included in the equal-cost multipath ECMP routing information.

In this embodiment, after receiving the VXLAN packet sent by the second network device, the first network device may determine, based on the path identifier in the VXLAN packet, the first routing information included in the equal-cost multipath ECMP routing information. A manner of determining the first routing information may be as follows: Because first network device first obtains the first routing information, and stores the first routing information in the ECMP routing information, after obtaining the path identifier, the first network device may match the path identifier with a path identifier in the ECMP routing information. For example, the obtained path identifier is "0", and path identifiers stored in the ECMP routing information include "0", "1", and the like. In this case, the first routing information corresponding to the path identifier "0" may be obtained through matching. In other words, the forwarding path of the service packet may be learned from the path identifier "0", that is, a path from the first network device to the VNF device corresponding to the destination IP address through an IPU corresponding to a next-hop address 10.1.1.1.

Optionally, before receiving the VXLAN packet sent by the second network device, the first network device may further first obtain the first routing information, and store the first routing information in the ECMP routing information, that is, store the first routing information in the local routing table on a side of the first network device. It should be noted that before the first routing information is obtained, a plurality of static routes to the destination IP address further is configured on the first network device. When the plurality of static routes are configured, path identifiers corresponding to the static routes is separately set. In other words, when the static route is configured, the path identifier is configured to indicate an exact forwarding path. Configuration of the static route is as follows:

ip route-static vpn-instance vpn1 201.1.1.1/32 10.1.1.1 tag 12345 track bfd-session b1 pathid 0;
    ip route-static vpn-instance vpn1 201.1.1.1/32 10.1.1.2 tag 12345 track bfd-session b1 pathid 1;

Therefore, it can be clearly learned from the first piece of static routing information that, a path corresponding to the path identifier pathid=0 is in a path direction that includes the IPU corresponding to the next-hop IP address 10.1.1.1 and a VNF device corresponding to a destination IP address 201.1.1.1. A path corresponding to the path identifier pathid=1 is in a path direction that includes an IPU corresponding to a next-hop IP address 10.1.1.2 and a VNF device corresponding to a destination IP address 201.1.1.1.

Usually, the first network device can notify the second network device of only one piece of static routing information. However, to enable the second network device to learn that there are a plurality of static routes that can reach the VNF device corresponding to the destination IP address through the first network device, EVPN routing information is generated by using the EVPN, so that the first network device can introduce a plurality of static routes with a "same prefix", and send the plurality of static routes to the second network device, to achieve load sharing. The "same prefix" mentioned above actually means that the plurality of static routes correspond to a same destination IP address.

It should be noted that the EVPN routing information is specifically a type 5 route, namely, an IP prefix route, and is mainly used to implement communication between a VXLAN and an external network. A packet format of the type 5—IP prefix route is as follows:

Pathid:0
type+len
Route Distinguisher
Ethernet Segment
Identifier
Ethernet Tag ID
IP Prefix Length
IP Prefix (VNF address)
GW IP Address (IPU 1)
MPLS Label It can be learned from above that a path identifier Pathid is filled on the basis of a traditional type 5 route, to indicate a corresponding forwarding path. For example, a value of Pathid is "0", and the corresponding forwarding path is IPU 1→VNF device.

It should be further noted that after the corresponding path identifiers are separately configured for the plurality of static routes, the first network device may further fill a first identifier field into the local routing table. The first identifier field is used to fill the path identifier. Reference may be made to the following table for understanding.

| Local routing table | Next hop | Outbound interface | First identifier field |
|---|---|---|---|
| VNF-IP | 10.1.1.1 | vbdif1 | 0 |
| VNF-IP | 10.1.1.2 | vbdif1 | 1 |
| VNF-IP | 7.7.7.7 | vxlan | NA |

It can be learned from the table that routing information in the row in which the first identifier field is "0" indicates that the service packet may be sent in a forwarding path that uses the outbound interface vbdif1 as an initial sending point, and passes through a node corresponding to the next-hop address 10.1.1.1 and the VNF device corresponding to the destination IP address. Likewise, it can be learned that routing information in the row in which the first identifier field is "1" indicates that the service packet may be sent in a forwarding path that uses the outbound interface vbdif1 as an initial sending point, and passes through a node corresponding to the next-hop address 10.1.1.2, and the VNF device corresponding to the destination IP address.

For example, if an IP address of an IPU 1 is set to 10.1.1.1 in advance, a routing entry indicated by the path identifier "0" is: first network device→IPU 1→VNF device. Likewise, if an IP address of an IPU 2 is set to 10.1.1.2 in advance, a routing entry indicated by the path identifier "1" is: first network device→IPU 2→VNF device.

It should be noted that the mentioned outbound interface is an interface for sending the EVPN routing information, and the first network device considers that the VNF device corresponding to the destination IP address and the outbound interface are in a "directly connected network", that is, in a same network segment. Therefore, to ensure that an interface of the second network device has an address resolution protocol (ARP) proxy capability; or transmission fails if the interface of the second network device does not have the address resolution protocol (ARP) proxy capability.

The first identifier field mentioned above may be an rcvpathid field or a field similar to a field used to fill the path identifier. This is not specifically limited herein.

305. The first network device forwards the service packet to the VNF device via the IPU based on the first routing information and a destination IP address.

In this embodiment, after obtaining the first routing information from the ECMP routing information through matching based on the path identifier, the first network device may precisely send the service packet to the VNF device via the IPU based on the first routing information and the destination IP address that are included in the service packet. For example, to be specific, the service packet may be forwarded along the following path: the first network device, the IPU corresponding to the next-hop address 10.1.1.1, and the VNF device corresponding to the destination IP address.

In this embodiment, by receiving the VXLAN packet that is sent by the second network device and that includes the path identifier and the service packet, the first network device can determine the first routing information based on the path identifier. In addition, the first routing information indicates the path from the first network device to the VNF device through the IPU, and therefore, the first network device may send the service packet to the VNF device via the IPU based on the first routing information and the destination IP address, so that the service packet is precisely sent to the VNF device corresponding to the destination IP address, thereby avoiding a three-layer traffic loop.

Figure 5:
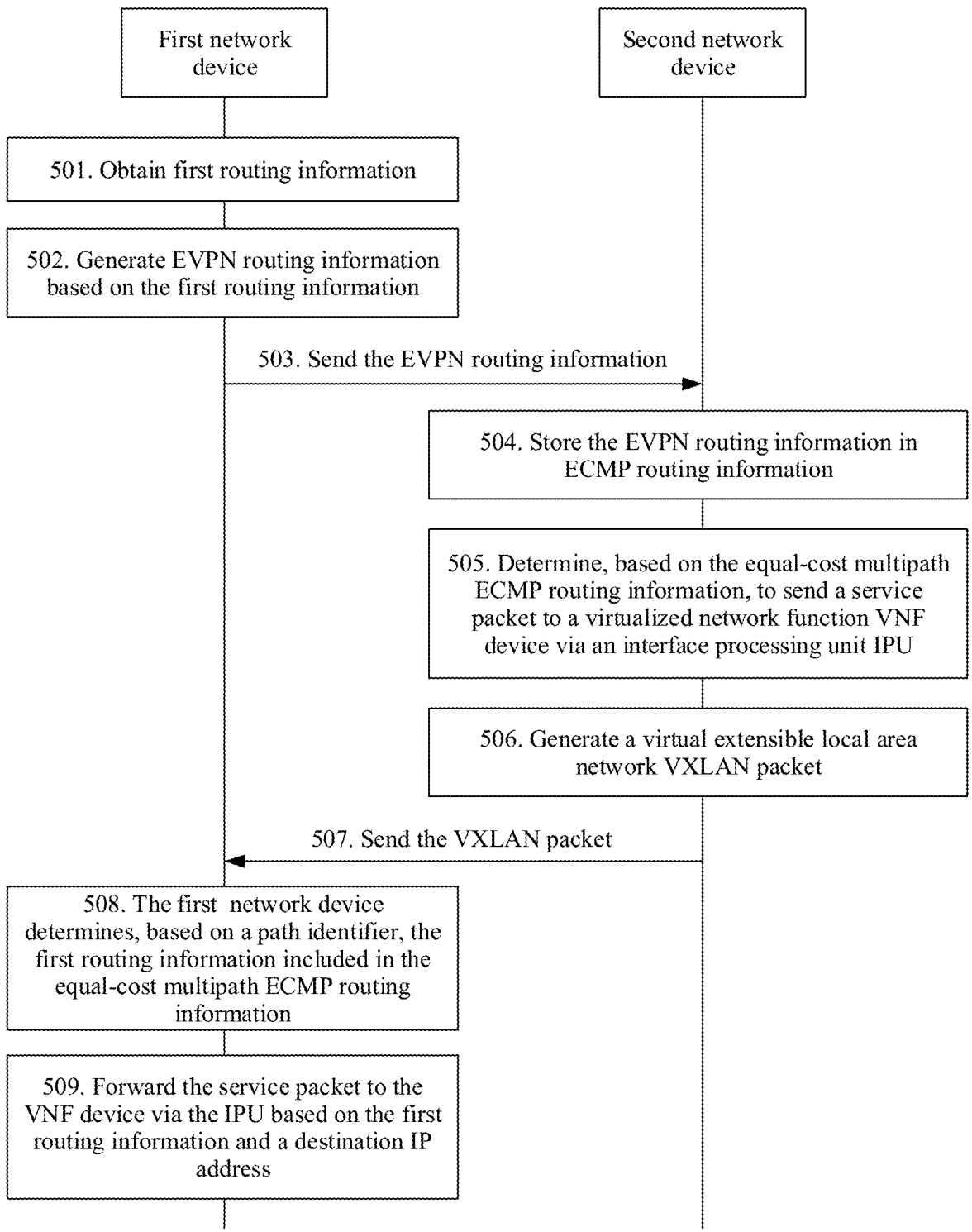
FIG. 5 is a schematic diagram of another embodiment of a packet processing method according to an embodiment of this application.

For ease of understanding, a specific procedure in the embodiments of this application is described below in detail. FIG. 5 is a schematic diagram of another embodiment of a packet processing method according to an embodiment of this application.

As shown in FIG. 5, the another embodiment of the packet processing method provided in this embodiment of this application includes the following steps.

501. A first network device obtains first routing information.

In this embodiment, this step is similar to step 301, and details are not described herein again.

502. The first network device generates EVPN routing information based on the first routing information.

In this embodiment, the first routing information may be obtained by configuring a static route, and the first network device can send only one static route to a second network device. Therefore, the first network device generates the EVPN routing information by using an EVPN, so as to notify the second network device of a plurality of pieces of routing information with a same prefix.

It should be noted that, optionally, after obtaining the first routing information, the first network device may further store the first routing information in ECMP routing information, that is, deliver the first routing information to a local routing table on a side of the first network device, so that after subsequently receiving a VXLAN packet, the first network device can determine the exact first routing information based on a path identifier in the VXLAN packet, to find a correct forwarding path, thereby reducing a process of performing addressing through broadcast again.

503. The first network device sends the EVPN routing information to a second network device.

504. The second network device stores the EVPN routing information in ECMP routing information.

In this embodiment, after receiving the EVPN routing information sent by the first network device, the second network device may store the EVPN routing information in the ECPM routing information, that is, deliver the EVPN routing information to a local routing table on a side of the second network device.

It should be noted that a manner of storing the EVPN routing information may be as follows: The second network device may fill a second identifier field into the local routing table to fill the path identifier into the local routing table on the side of the second network device. In this way, when sending the VXLAN packet to the first network device, the second network device may query the local routing table to select the path identifier from the second identifier field for forwarding. Reference may be made to the following table for understanding.

| Local routing table | Next hop | Outbound interface | Second identifier field |
|---|---|---|---|
| VNF-IP | 10.1.1.1 | vbdif1 | 0 |
| VNF-IP | 10.1.1.2 | vbdif1 | 1 |
| VNF-IP | 7.7.7.7 | vxlan | NA |

It can be learned from the table that routing information in the row in which the second identifier field is "0" indicates that the service packet may be sent in a forwarding path that uses the outbound interface vbdif1 as an initial sending point, and passes through a node corresponding to a next-hop address 10.1.1.1, and a VNF device corresponding to a destination IP address. Likewise, it can be learned that routing information in the row in which the second identifier field is "1" indicates that the service packet may be sent in a forwarding path that uses the outbound interface vbdif1 as an initial sending point, and passes through a node corresponding to a next-hop address 10.1.1.2, and the VNF device corresponding to the destination IP address.

With reference to the embodiment described in FIG. 3, the following is clearly indicated on the side of the first network device: If an IP address of an IPU 1 is set to 10.1.1.1 in advance, a routing entry indicated by the path identifier "0" is: first network device→IPU 1→VNF device. Likewise, if an IP address of an IPU 2 is set to 10.1.1.2 in advance, a routing entry indicated by the path identifier "1" is: first network device→IPU 2→VNF device. Therefore, the second network device stores the EVPN routing information, to provide a convenient manner for subsequent forwarding of a service packet to a relatively great extent.

The second identifier field mentioned above may be a sendpathid field or a field similar to a field used to fill the path identifier. This is not specifically limited herein.

505. The second network device determines, based on the equal-cost multipath ECMP routing information, to send a service packet to a virtualized network function VNF device via an interface processing unit IPU.

506. The second network device generates a virtual extensible local area network VXLAN packet.

In this embodiment, the VXLAN packet includes the path identifier and the service packet, and the path identifier may be used to indicate a path from the first network device to the VNF device through the IPU. As shown in FIG. 4, a flag bit may be set in the packet header of the VXLAN packet to indicate that the VXLAN packet includes the path identifier. To be specific, the flag bit is first set in the packet header of the VXLAN packet, and is usually set at a location of a sixth bit of the packet header. If a value of the flag bit is 1, it indicates that the VXLAN packet carries the path identifier mentioned above. On the contrary, if the value is 0, it indicates that the VXLAN packet does not carry the path identifier. Therefore, after the flag bit is set to 1, that is, when the value is 1, a label field may be further filled into the packet header to store the path identifier. The label field is usually located in an MPLS label field in the packet header. For details, reference may be made to step 302 in FIG. 3 for understanding.

507. The second network device sends the VXLAN packet to the first network device.

In this embodiment, after generating the corresponding VXLAN packet, the second network device may send the VXLAN packet to the first network device, so that the first network device may obtain the path identifier and the service packet that are included in the VXLAN packet.

It should be noted that because the service packet includes the destination IP address, after receiving the VXLAN packet, the first network device may learn, by querying the local routing table, a virtualized network function device corresponding to the destination IP address.

508. The first network device determines, based on a path identifier, the first routing information included in the equal-cost multipath ECMP routing information.

In this embodiment, after receiving the VXLAN packet sent by the second network device, the first network device may determine, based on the path identifier in the VXLAN packet, the first routing information included in the equal-cost multipath ECMP routing information.

A manner of determining the first routing information may be as follows: The first network device stores the first routing information in the ECMP routing information. Therefore, the first network device may obtain the path identifier after parsing the VXLAN packet, and may match the path identifier with a path identifier in the ECMP routing information. For example, the obtained path identifier is "0", and path identifiers stored in the ECMP routing information include "0", "1", and the like. In this case, the first routing information corresponding to the path identifier "0" may be obtained through matching. In other words, a forwarding path of the service packet may be learned from the path identifier "0", that is, a path from the first network device to the VNF device corresponding to the destination IP address through an IPU corresponding to a next-hop address 10.1.1.1, that is, a path reaching the VNF device corresponding to the destination IP address through the IPU 1.

It should be noted that the VXLAN packet further includes the flag bit that may be used to indicate that the VXLAN packet includes the path identifier. Therefore, after parsing the VXLAN packet, the first network device first determines whether the flag bit is set to 1, that is, whether the flag bit is 1, to determine whether the VXLAN packet carries the path identifier. Because the flag bit is set at the location of the sixth bit of the packet header, the first network device may directly determine, after parsing the VXLAN packet, whether a value of the sixth bit is 1.

Because the second network device fills the path identifier into the label field of the packet header, after determining that the flag bit is set to 1, the first network device may obtain the path identifier from the label field of the packet header. For example, if the second network device fills the path identifier "0" into the label field, the path identifier that can be obtained by the first network device is "0".

509. The first network device forwards the service packet to the VNF device via the IPU based on the first routing information and a destination IP address.

In this embodiment, after obtaining the first routing information from the ECMP routing information through matching based on the path identifier, the first network device may precisely send the service packet to the VNF device via the IPU based on the first routing information and the destination IP address that are included in the service packet. For example, to be specific, the service packet may be forwarded along the following path: the first network device, the IPU (that is, the IPU 1) corresponding to the next-hop address 10.1.1.1, and the VNF device corresponding to the destination IP address.

In this embodiment, by receiving the VXLAN packet that is sent by the second network device and that includes the path identifier and the service packet, the first network device can determine the first routing information based on the path identifier. In addition, the first routing information indicates the path from the first network device to the VNF device through the IPU, and therefore, the first network device may send the service packet to the VNF device via the IPU based on the first routing information and the destination IP address, so that the service packet is precisely sent to the VNF device corresponding to the destination IP address, thereby avoiding a three-layer traffic loop.

Figure 6:
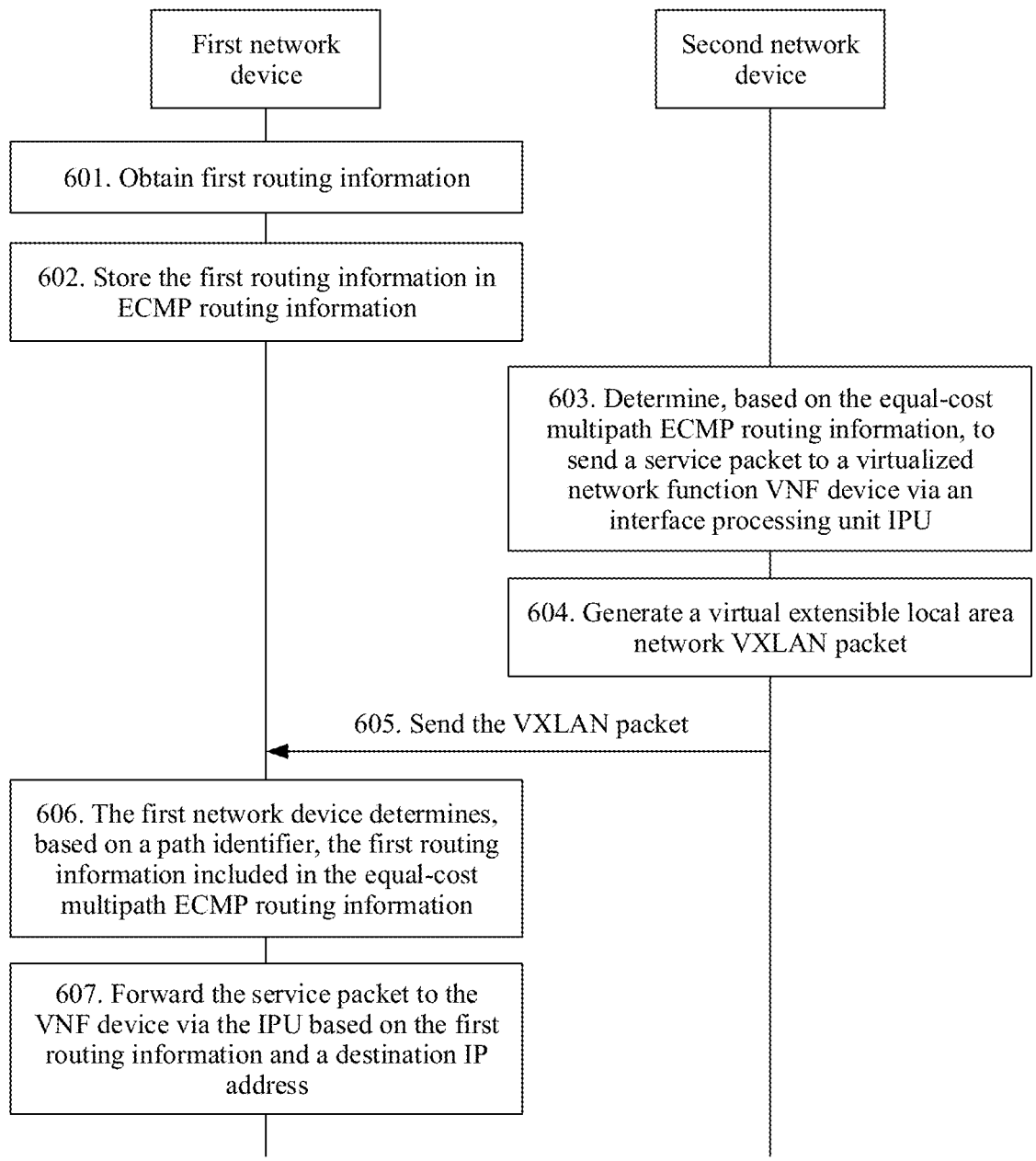
FIG. 6 is a schematic diagram of another embodiment of a packet processing method according to an embodiment of this application.

For ease of understanding, a specific procedure in the embodiments of this application is described below in detail. FIG. 6 is a schematic diagram of another embodiment of a packet processing method according to an embodiment of this application.

As shown in FIG. 6, the another embodiment of the packet processing method provided in this embodiment of this application includes the following steps.

601. A first network device obtains first routing information.

602. The first network device stores the first routing information in ECMP routing information.

In this embodiment, the first routing information is stored in the ECMP routing information, that is, the first routing information is delivered to a local routing table on a side of the first network device, so that after subsequently receiving a VXLAN packet, the first network device can determine the exact first routing information on a path identifier in the VXLAN packet, to find a correct forwarding path.

603. A second network device determines, based on the equal-cost multipath ECMP routing information, to send a service packet to a virtualized network function VNF device via an interface processing unit IPU.

604. The second network device generates a virtual extensible local area network VXLAN packet.

605. The second network device sends the VXLAN packet to the first network device.

In this embodiment, steps 603 to 605 are similar to steps 301 to 303, and details are not described herein again.

606. The first network device determines, based on a path identifier, the first routing information included in the equal-cost multipath ECMP routing information.

In this embodiment, after receiving the VXLAN packet sent by the second network device, the first network device may determine, based on the path identifier in the VXLAN packet, the first routing information included in the equal-cost multipath ECMP routing information.

A manner of determining the first routing information may be as follows: The first network device stores the first routing information in the ECMP routing information. Therefore, the first network device may obtain the path identifier after parsing the VXLAN packet, and may match the path identifier with a path identifier in the ECMP routing information. For example, the obtained path identifier is "0", and path identifiers stored in the ECMP routing information include "0", "1", and the like. In this case, the first routing information corresponding to the path identifier "0" may be obtained through matching. In other words, a forwarding path of the service packet may be learned from the path identifier "0", that is, a path from the first network device to the VNF device corresponding to the destination IP address through an IPU corresponding to a next-hop address 10.1.1.1, that is, a path reaching the VNF device corresponding to the destination IP address through an IPU 1.

It should be noted that the VXLAN packet further includes the flag bit that may be used to indicate that the VXLAN packet includes the path identifier. Therefore, after parsing the VXLAN packet, the first network device first determines whether the flag bit is set to 1, that is, whether the flag bit is 1, to determine whether the VXLAN packet carries the path identifier. Because the flag bit is set at the location of the sixth bit of the packet header, the first network device may directly determine, after parsing the VXLAN packet, whether a value of the sixth bit is 1.

Because the second network device fills the path identifier into the label field of the packet header, after determining that the flag bit is set to 1, the first network device may obtain the path identifier from the label field of the packet header. For example, if the second network device fills the path identifier "0" into the label field, the path identifier that can be obtained by the first network device is "0".

607. The first network device forwards the service packet to the VNF device via the IPU based on the first routing information and a destination IP address.

In this embodiment, after obtaining the first routing information from the ECMP routing information through matching based on the path identifier, the first network device may precisely send the service packet to the VNF device via the IPU based on the first routing information and the destination IP address that are included in the service packet. For example, to be specific, the service packet may be forwarded along the following path: the first network device, the IPU (that is, the IPU 1) corresponding to the next-hop address 10.1.1.1, and the VNF device corresponding to the destination IP address.

In this embodiment, by receiving the VXLAN packet that is sent by the second network device and that includes the path identifier and the service packet, the first network device can determine the first routing information based on the path identifier. In addition, the first routing information indicates the path from the first network device to the VNF device through the IPU, and therefore, the first network device may send the service packet to the VNF device via the IPU based on the first routing information and the destination IP address, so that the service packet is precisely sent to the VNF device corresponding to the destination IP address, thereby avoiding a three-layer traffic loop.

The solutions provided in the embodiments of this application are mainly described above from a perspective of interaction. It may be understood that, to implement the foregoing functions, the packet forwarding apparatus and the packet processing apparatus include corresponding hardware structures and/or software modules for performing the functions. A person skilled in the art should be easily aware that, in combination with modules and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the packet forwarding apparatus and the packet processing apparatus may be divided into functional modules based on the foregoing method examples. For example, each functional module may be obtained through division based on each function, or two or more functions may be integrated into one processing module. The integrated module may be implemented in a form of hardware, or may be implemented in a form of a software functional module. It should be noted that, in the embodiments of this application, division into the modules is an example, and is merely logical function division. In actual implementation, another division manner may be used.

Figure 7:
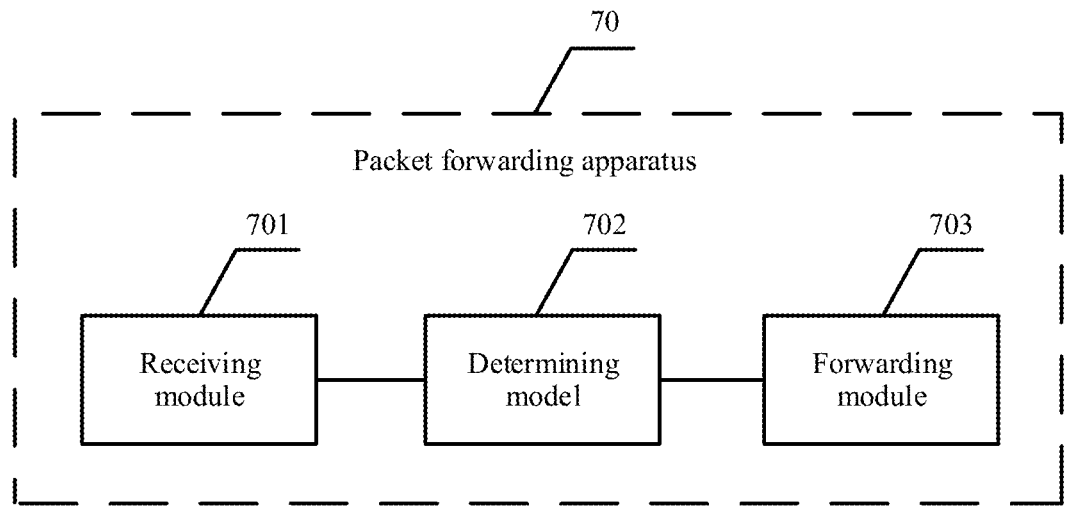
FIG. 7 is a schematic diagram of an embodiment of a packet forwarding apparatus according to an embodiment of this application.

The packet forwarding apparatus in this application is described below in detail. FIG. 7 is a schematic diagram of an embodiment of a packet forwarding apparatus according to an embodiment of this application. The packet forwarding apparatus is applied to an Ethernet virtual private network EVPN, and the EVPN further includes a packet processing apparatus. The packet forwarding apparatus 70 includes:

a receiving module 701, configured to receive a virtual extensible local area network VXLAN packet sent by a packet generation apparatus, where the VXLAN packet includes a path identifier and a service packet, the path identifier indicates a path from the packet forwarding apparatus to a virtualized network function VNF device through an interface processing unit IPU, the packet forwarding apparatus is connected to the IPU, the service packet includes a destination Internet Protocol IP address, the destination IP address is an IP address of the VNF device, and the IPU is connected to the VNF device;

a determining module 702, configured to determine, based on the path identifier included in the VXLAN packet received by the receiving module 701, first routing information included in equal-cost multipath ECMP routing information, where the first routing information indicates the path from the packet forwarding apparatus to the VNF device through the IPU; and a forwarding module 703, configured to forward the service packet to the VNF device via the IPU based on the first routing information determined by the determining module 702 and the destination IP address included in the VXLAN packet received by the receiving module.

In this embodiment of this application, the path identifier may be used to indicate the path from the packet forwarding apparatus to the virtualized network function VNF device through the interface processing unit IPU, and therefore, the receiving module 701 receives the VXLAN packet that is sent by the packet processing apparatus and that includes the path identifier and the service packet, so that the determining module 702 can determine the first routing information based on the path identifier included in the VXLAN packet received by the receiving module 701. The first routing information indicates the path from the packet forwarding apparatus to the VNF device through the IPU, and therefore, the forwarding module 703 may send the service packet to the VNF device via the IPU based on the first routing information determined by the determining module 702 and the destination IP address included in the VXLAN packet received by the receiving module 701. In this way, the service packet is precisely sent to the VNF device corresponding to the destination IP address, thereby avoiding a three-layer traffic loop.

Figure 8:
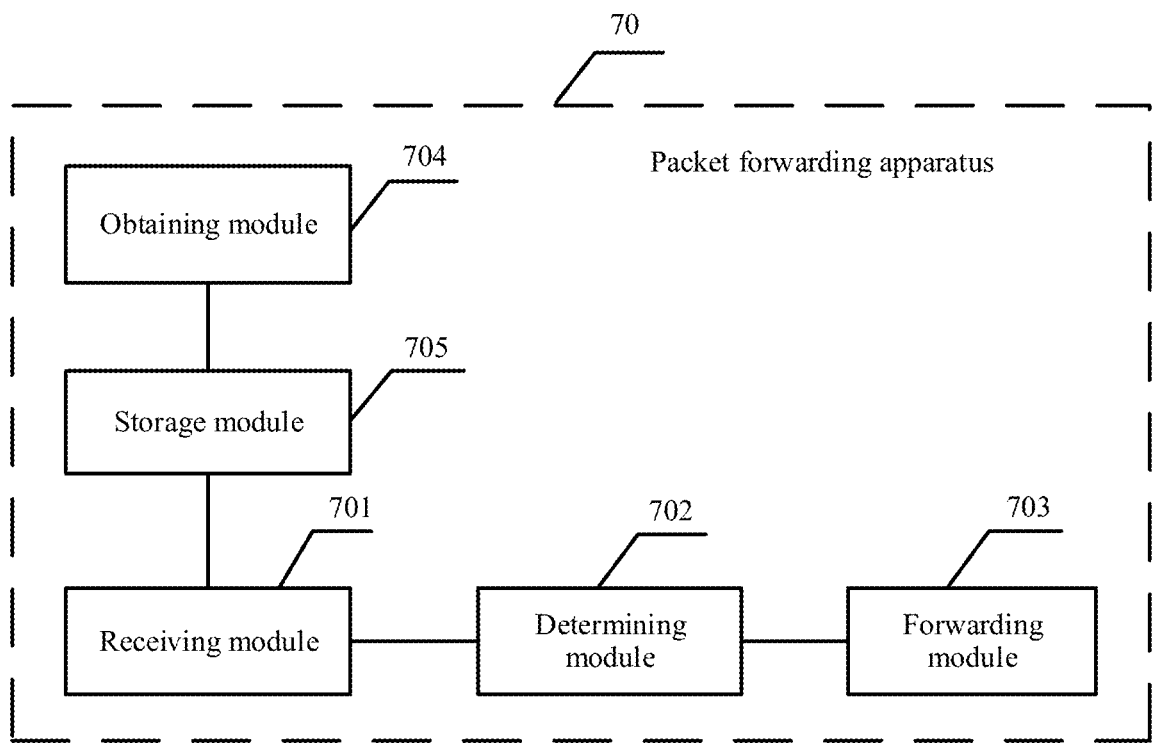
FIG. 8 is a schematic diagram of another embodiment of a packet forwarding apparatus according to an embodiment of this application.

Optionally, based on the embodiment corresponding to FIG. 7, FIG. 8 is a schematic diagram of another embodiment of a packet forwarding apparatus according to an embodiment of this application. The packet forwarding apparatus 70 further includes:

an obtaining module 704, configured to obtain the first routing information before the receiving module 701 receives the virtual extensible local area network VXLAN packet sent by the packet processing apparatus; and a storage module 705, configured to store, in the ECMP routing information, the first routing information obtained by the obtaining module 704.

In this embodiment, the first routing information indicates the path from the packet forwarding apparatus to the VNF device through the IPU. Therefore, after the obtaining module 704 obtains the first routing information, the storage module 705 stores the first routing information in the ECMP routing information, so that a convenient path selection manner can be provided for subsequent forwarding of a packet such as a service packet.

Figure 9:
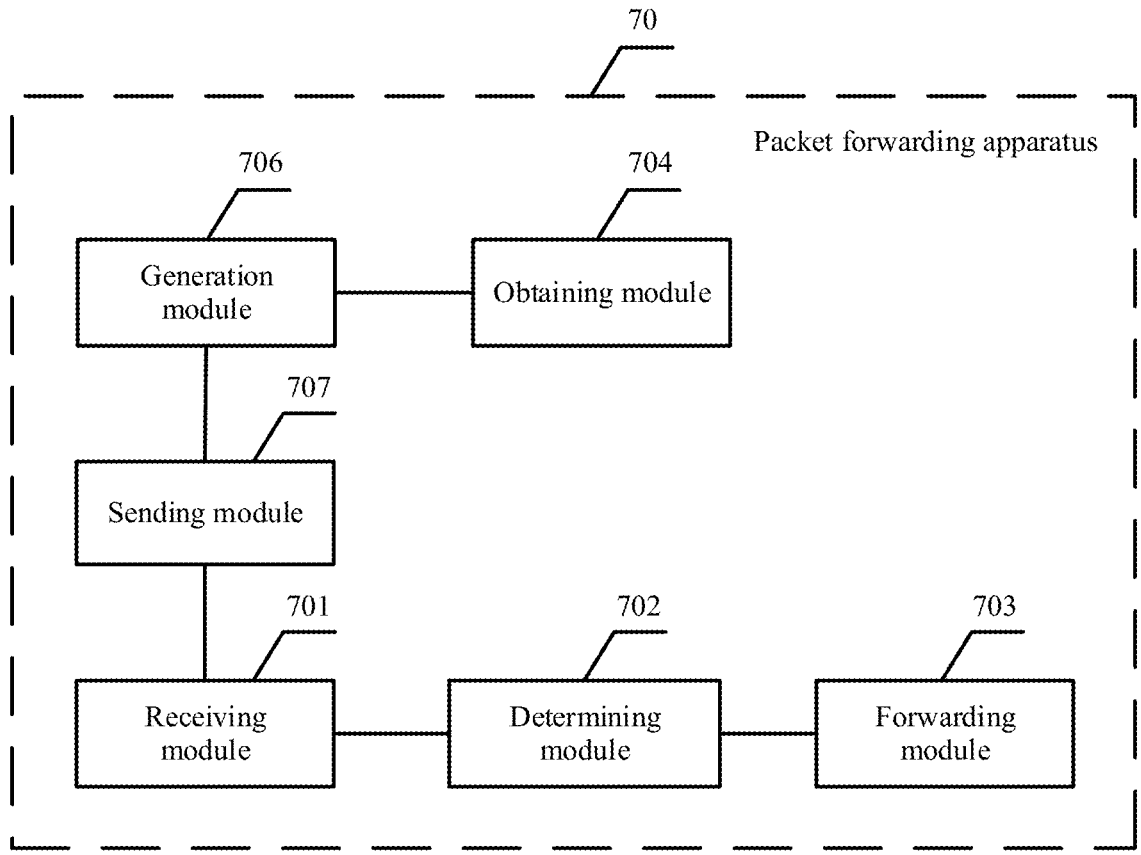
FIG. 9 is a schematic diagram of another embodiment of a packet forwarding apparatus according to an embodiment of this application.

Optionally, based on the embodiment corresponding to FIG. 7, FIG. 9 is a schematic diagram of another embodiment of a packet forwarding apparatus according to an embodiment of this application. The packet forwarding apparatus 70 further includes:

a generation module 706, configured to generate EVPN routing information based on the first routing information after the obtaining module 704 obtains the first routing information, where the EVPN routing information includes the path identifier and the destination IP address; and a sending module 707, configured to send, to the packet processing apparatus, the EVPN routing information generated by the generation module 706.

In this embodiment, to enable the packet processing apparatus to learn that there are a plurality of routes to reach the VNF device corresponding to the destination IP address, the generation module 706 generates the EVPN routing information based on the first routing information, and the sending module 707 sends the EVPN routing information to the packet processing apparatus. Therefore, the packet processing apparatus can store the EVPN routing information, so as to provide a convenient path selection manner for subsequent forwarding of a packet such as a service packet.

Figure 10:
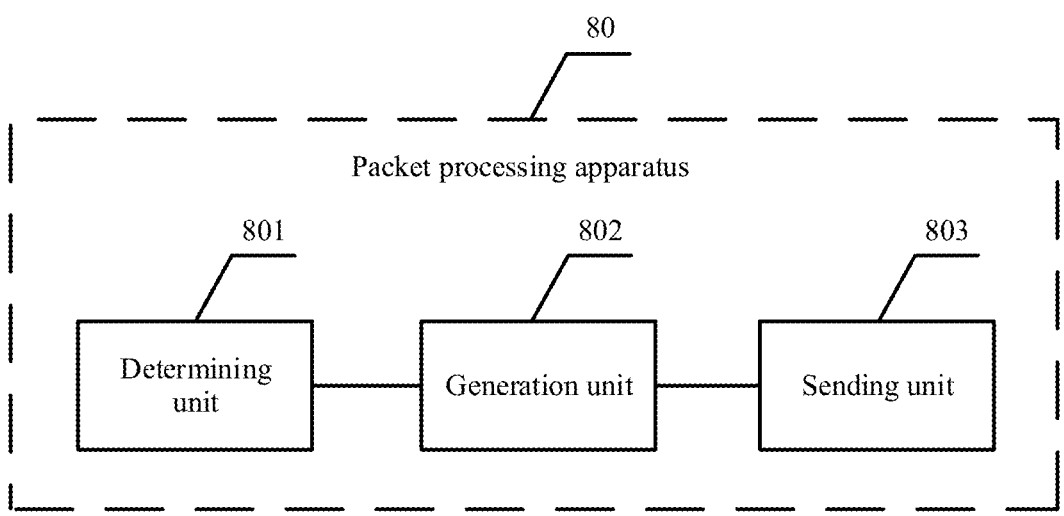
FIG. 10 is a schematic diagram of an embodiment of a packet processing apparatus according to an embodiment of this application.

The packet processing apparatus in this application is described below in detail. FIG. 10 is a schematic diagram of an embodiment of a packet processing apparatus according to an embodiment of this application. The packet processing apparatus is applied to an Ethernet virtual private network EVPN, and the EVPN further includes a packet forwarding apparatus. The packet processing apparatus 80 includes:

a determining unit 801, configured to determine, based on equal-cost multipath ECMP routing information, to send a service packet to a virtualized network function VNF device via an interface processing unit IPU, where the packet forwarding apparatus is connected to the IPU, the IPU is connected to the VNF device, the service packet includes a destination Internet Protocol IP address, and the destination IP address is an IP address of the VNF device;

a generation unit 802, configured to generate a virtual extensible local area network VXLAN packet, where the VXLAN packet includes a path identifier and the service packet determined by the determining unit 801, and the path identifier indicates a path from the packet forwarding apparatus to the VNF device through the IPU; and a sending unit 803, configured to send, to the packet forwarding apparatus, the VXLAN packet generated by the generation unit 802, where the path identifier triggers the packet forwarding apparatus to forward the service packet based on the path indicated by the path identifier.

In this embodiment of this application, the generation unit 802 encapsulates the path identifier and the service packet determined by the determining unit 801 into the VXLAN packet, and the VXLAN packet carries the path identifier that may be used to indicate a forwarding path of the service packet. Therefore, the sending unit 803 sends the service packet to the packet forwarding apparatus, so that efficiency and precision of forwarding the service packet can be effectively improved.

Figure 11:
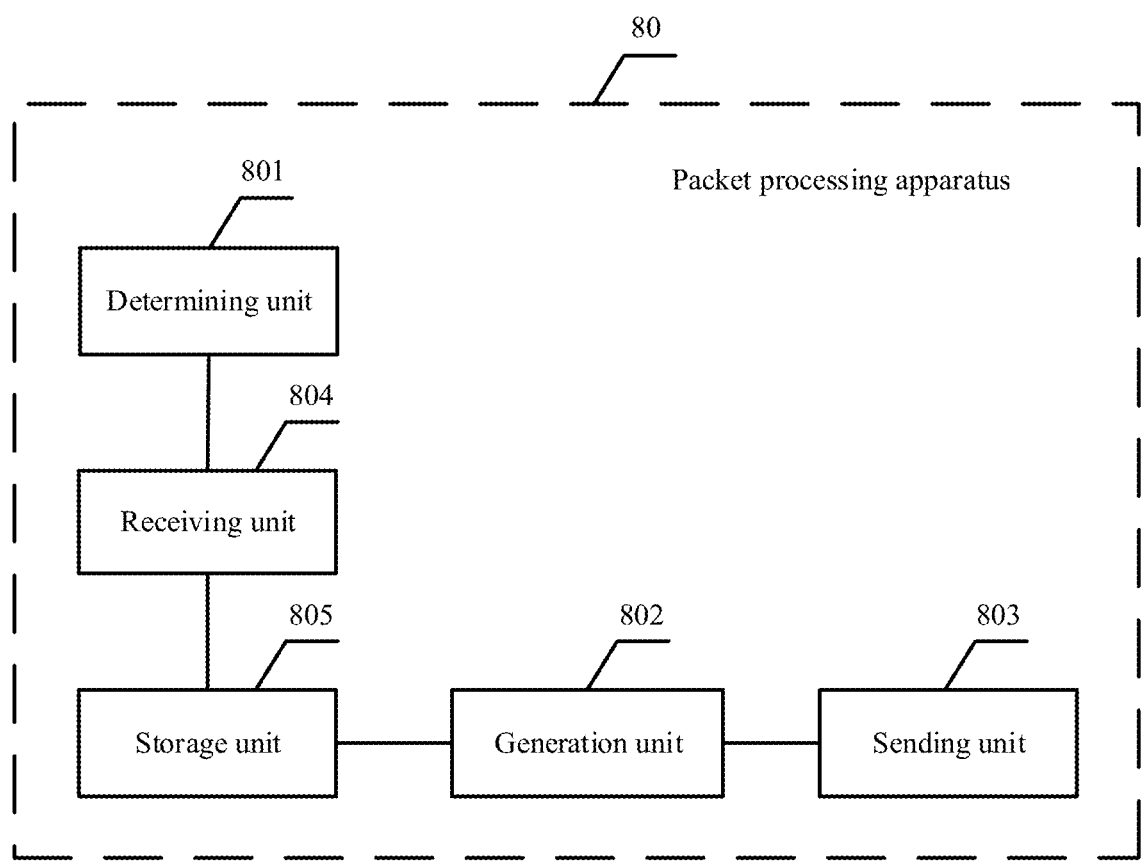
FIG. 11 is a schematic diagram of an embodiment of a packet processing apparatus according to an embodiment of this application.

Optionally, based on the embodiment corresponding to FIG. 10, FIG. 11 is a schematic diagram of another embodiment of a packet processing apparatus according to an embodiment of this application. The packet processing apparatus 80 further includes:

a receiving unit 804, configured to: before the generation unit 802 generates the virtual extensible local area network VXLAN packet, receive EVPN routing information sent by the packet forwarding apparatus, where the EVPN routing information includes the path identifier and the destination IP address; and a storage unit 805, configured to store the EVPN routing information in the ECMP routing information after the receiving unit 804 receives the EVPN routing information sent by the packet forwarding apparatus.

In this embodiment, the EVPN routing information may notify the packet processing apparatus that there are a plurality of routes to reach the VNF device corresponding to the destination IP address. Therefore, the storage unit 805 stores the EVPN routing information after the receiving unit 804 receives the EVPN routing information, so as to provide a convenient path selection manner for subsequent forwarding of a packet such as a service packet.

It should be noted that content such as information exchange between the modules/units of the apparatus and the execution processes thereof is based on the same idea as the method embodiments of this application, and produces the same technical effects as the method embodiments of this application. For the specific content, refer to the foregoing description in the method embodiments of this application, and the details are not described herein again.

Figure 12:
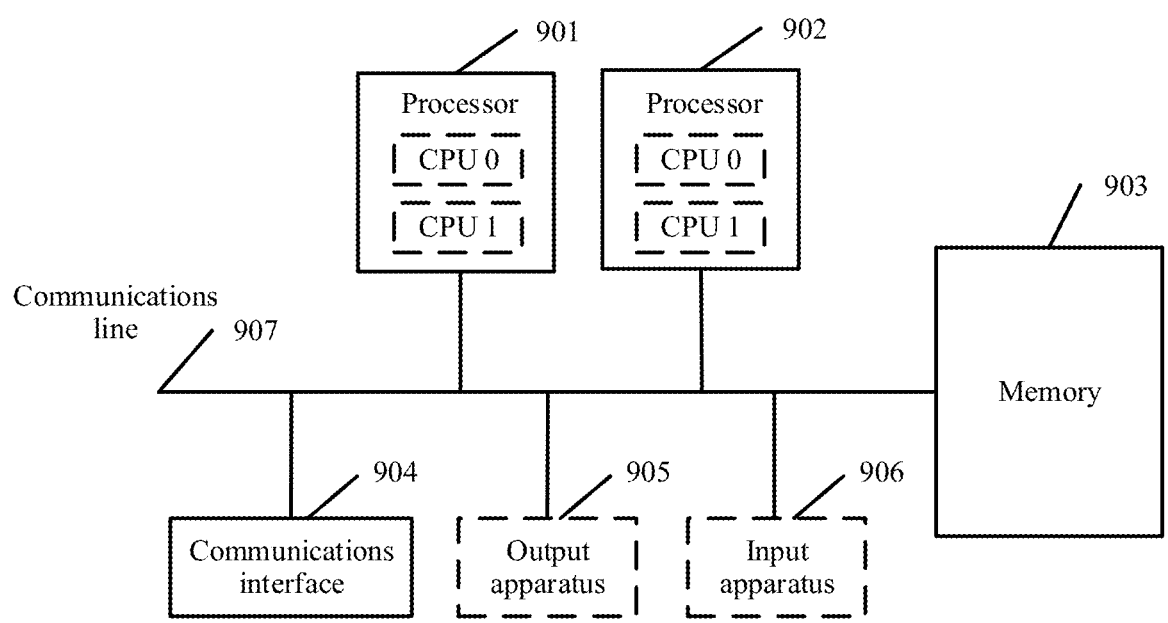
FIG. 12 is a schematic diagram of a hardware structure of a communications apparatus according to an embodiment of this application.

The packet forwarding apparatus and the packet processing apparatus in the embodiments of this application are described above from a perspective of a modular functional entity, and the packet forwarding apparatus and the packet processing apparatus in the embodiments of this application are described below from a perspective of hardware processing. FIG. 12 is a schematic diagram of a hardware structure of a communications apparatus according to an embodiment of this application. As shown in FIG. 12, the communications apparatus may include:

The communications apparatus includes at least one processor 901, a communications line 907, a memory 903, and at least one communications interface 904.

The processor 901 may be a general-purpose central processing unit (CPU), a microprocessor, an application-specific integrated circuit (application-specific integrated circuit, ASIC), or one or more integrated circuits configured to control program execution of the solutions in this application.

The communications line 907 may include a channel for transmitting information between the foregoing components.

The communications interface 904 is any apparatus such as a transceiver, and is configured to communicate with another device or communications network such as an Ethernet.

The memory 903 may be a read-only memory (ROM) or another type of static storage apparatus that can store static information and an instruction, a random access memory (RAM) or another type of dynamic storage apparatus that can store information and an instruction. The memory may exist independently, and is connected to the processor by using the communications line 907; or the memory may be integrated with the processor.

The memory 903 is configured to store computer executable instructions for executing the solutions in this application, and the processor 901 controls the execution. The processor 901 is configured to execute the computer executable instructions stored in the memory 903, so as to implement the packet processing method provided in the foregoing embodiments of this application.

Optionally, the computer executable instructions in this embodiment of this application may also be referred to as application program code. This is not specifically limited in this embodiment of this application.

In specific implementation, in an embodiment, the communications apparatus may include a plurality of processors, for example, the processor 901 and a processor 902 in FIG. 12. Each of the processors may be a single-core (single-CPU) processor, or may be a multi-core (multi-CPU) processor. The processor herein may be one or more apparatuses, circuits, and/or processing cores configured to process data (such as a computer program instruction).

In specific implementation, in an embodiment, the communications apparatus may further include an output apparatus 905 and an input apparatus 906. The output apparatus 905 communicates with the processor 901, and may display information in a plurality of manners. The input apparatus 906 communicates with the processor 901, and may receive user input in a plurality of manners. For example, the input apparatus 906 may be a mouse, a touchscreen apparatus, a sensing apparatus, or the like.

The communications apparatus may be a general-purpose apparatus or a dedicated apparatus. In specific implementation, the communications apparatus may be a desktop computer, a portable computer, a network server, a wireless terminal apparatus, an embedded apparatus, or an apparatus having a structure similar to that shown in FIG. 12. A type of the communications apparatus is not limited in this embodiment of this application.

All or some of the foregoing embodiments may be implemented by using software, hardware, firmware, or any combination thereof. When software is used to implement the embodiments, the embodiments may be implemented completely or partially in a form of a computer program product.

It may be clearly understood by a person skilled in the art that, for the purpose of convenient and brief description, for a detailed working process of the packet forwarding apparatus and the packet processing apparatus, unit, and module described above, refer to a corresponding process in the foregoing method embodiments, and details are not described herein again.

In the several embodiments provided in this application, it should be understood that the disclosed device and method may be implemented in other manners. For example, the described packet forwarding apparatus and packet processing apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the modules or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual specifications to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A packet processing method for an Ethernet virtual private network (EVPN), the EVPN comprises a first network device and a second network device, and the method comprises:
 receiving, by the first network device, a virtual extensible local area network (VXLAN) packet sent by the second network device, wherein:
  the VXLAN packet comprises a path identifier and a service packet;

the path identifier indicates a path from the first network device to a virtualized network function (VNF) device through an interface processing unit (IPU);
the first network device is connected to the IPU; and
the service packet comprises a destination Internet Protocol (IP) address, the destination IP address is an IP address of the VNF device, and the IPU is connected to the VNF device;
determining, by the first network device based on the path identifier, first routing information from equal-cost multipath (ECMP) routing information, wherein the first routing information indicates the path from the first network device to the VNF device through the IPU; and
forwarding, by the first network device, the service packet to the VNF device via the IPU based on the first routing information and the destination IP address.

2. The method according to claim 1, wherein before the receiving, by the first network device, the VXLAN packet sent by the second network device, the method further comprises:
obtaining, by the first network device, the first routing information; and
including, by the first network device, the first routing information in the ECMP routing information.

3. The method according to claim 2, wherein after the obtaining, by the first network device, the first routing information, the method further comprises:
generating, by the first network device, EVPN routing information based on the first routing information, wherein the EVPN routing information comprises the path identifier and the destination IP address; and
sending, by the first network device, the EVPN routing information to the second network device.

4. The method according to claim 1, wherein the VXLAN packet further comprises a flag bit, and the flag bit indicates that the VXLAN packet comprises the path identifier.

5. A packet forwarding apparatus, wherein the packet forwarding apparatus is applied to an Ethernet virtual private network (EVPN), the EVPN further comprises a packet processing apparatus, and the packet forwarding apparatus comprises:
a non-transitory memory storing instructions; and
a processor coupled to the non-transitory memory;
wherein the instructions, when executed by the processor, configure the packet forwarding apparatus to:
receive a virtual extensible local area network (VXLAN) packet sent by a packet generation apparatus, wherein:
the VXLAN packet comprises a path identifier and a service packet;
the path identifier indicates a path from the packet forwarding apparatus to a virtualized network function (VNF) device through an interface processing unit (IPU);
the packet forwarding apparatus is connected to the IPU;
the service packet comprises a destination Internet Protocol (IP) address; and
the destination IP address is an IP address of the VNF device, and the IPU is connected to the VNF device;
determine, based on the path identifier from the VXLAN packet, first routing information comprised in equal-cost multipath (ECMP) routing information, wherein the first routing information indicates the path from the packet forwarding apparatus to the VNF device through the IPU; and
forward the service packet to the VNF device via the IPU based on the first routing information and the destination IP address comprised in the VXLAN packet.

6. The packet forwarding apparatus according to claim 5, wherein the instructions, when executed by the processor, further configure the packet forwarding apparatus to:
obtain the first routing information before the packet forwarding apparatus receives the VXLAN packet sent by the packet processing apparatus; and
include, in the ECMP routing information, the first routing information.

7. The packet forwarding apparatus according to claim 6, wherein the instructions, when executed by the processor, further configure the packet forwarding apparatus configured to:
generate EVPN routing information based on the first routing information after the packet forwarding apparatus obtains the first routing information, wherein the EVPN routing information comprises the path identifier and the destination IP address; and
send, to the packet processing apparatus, the EVPN routing information.

8. The packet forwarding apparatus according to claim 5, wherein the VXLAN packet further comprises a flag bit, and the flag bit is used to indicate that the VXLAN packet comprises the path identifier.

9. A packet processing apparatus for an Ethernet virtual private network (EVPN), the EVPN further comprises a packet forwarding apparatus, and the packet processing apparatus comprises:
a non-transitory memory storing instructions; and
a processor coupled to the non-transitory memory;
wherein the instructions, when executed by the processor, configure packet processing apparatus to:
determine, based on equal-cost multipath (ECMP) routing information, to send a service packet to a virtualized network function (VNF) device via an interface processing unit (IPU), wherein:
the packet forwarding apparatus is connected to the IPU;
the IPU is connected to the VNF device, the service packet comprises a destination Internet Protocol (IP) address; and
the destination IP address is an IP address of the VNF device;
generate a virtual extensible local area network (VXLAN) packet, wherein:
the VXLAN packet comprises a path identifier and the service packet; and
the path identifier indicates a path from the packet forwarding apparatus to the VNF device through the IPU; and
send, to the packet forwarding apparatus, the VXLAN packet, wherein the path identifier triggers the packet forwarding apparatus to forward the service packet based on the path indicated by the path identifier.

10. The packet processing apparatus according to claim 9, wherein the instructions, when executed by the processor, further configure the packet processing apparatus to:
before the packet processing apparatus generates the VXLAN packet, receive EVPN routing information sent by the packet forwarding apparatus, wherein the EVPN routing information comprises the path identifier and the destination IP address.

11. The packet processing apparatus according to claim 10, wherein the instructions, when executed by the processor, further configure the packet processing apparatus to:

include the EVPN routing information in the ECMP routing information after the packet processing apparatus receives the EVPN routing information sent by the packet forwarding apparatus.

12. The packet processing apparatus according to claim 9, wherein the VXLAN packet further comprises a flag bit, and the flag bit indicates that the VXLAN packet comprises the path identifier.

* * * * *